United States Patent
Suzuki

(10) Patent No.: US 9,485,379 B2
(45) Date of Patent: Nov. 1, 2016

(54) IMAGE FORMING APPARATUS INCLUDING AUXILIARY STORAGE PART LIMITED IN THE NUMBER OF TIMES REWRITING, IMAGE FORMING METHOD, AND RECORDING MEDIUM

(71) Applicant: KYOCERA Document Solutions Inc., Osaka (JP)

(72) Inventor: Masahiro Suzuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/447,633

(22) Filed: Jul. 31, 2014

(65) Prior Publication Data

US 2015/0036169 A1      Feb. 5, 2015

(30) Foreign Application Priority Data

Jul. 31, 2013    (JP) ................................ 2013-158822

(51) Int. Cl.
     *H04N 1/00*          (2006.01)
     *G06F 9/44*           (2006.01)

(52) U.S. Cl.
     CPC ........ *H04N 1/00928* (2013.01); *G06F 9/4406* (2013.01); *H04N 1/00931* (2013.01)

(58) Field of Classification Search
     CPC ............. G06F 11/1417; G06F 9/4401; G06F 9/4406; G05B 2219/23307; G05B 2219/36386; G05B 2219/13062; H04N 21/443; H04N 21/4432; H04N 1/00928
See application file for complete search history.

(56) References Cited

U.S. PATENT DOCUMENTS

| | | | | |
|---|---|---|---|---|
| 7,577,991 B2 * | 8/2009 | Huynh | ................... | G06F 21/85 711/200 |
| 8,140,837 B2 * | 3/2012 | Campbell et al. | ................ | 713/1 |
| 2003/0159086 A1 * | 8/2003 | Arndt | ..................... | G01B 21/20 714/25 |
| 2005/0278147 A1 * | 12/2005 | Morton et al. | ................ | 702/183 |
| 2006/0075284 A1 * | 4/2006 | Skan | ........................ | G06F 8/63 714/5.1 |
| 2010/0070800 A1 * | 3/2010 | Hanna | ............................... | 714/6 |
| 2010/0115252 A1 * | 5/2010 | Campbell | ........... | G06F 11/1415 713/1 |
| 2010/0281273 A1 * | 11/2010 | Lee | ......................... | G06F 21/72 713/190 |
| 2011/0173632 A1 * | 7/2011 | Arimilli et al. | ............... | 718/108 |
| 2011/0265095 A1 * | 10/2011 | Cardona et al. | .............. | 718/105 |
| 2011/0276786 A1 * | 11/2011 | Eichenberger et al. | ...... | 712/207 |
| 2011/0320840 A1 * | 12/2011 | Nayar et al. | .................. | 713/323 |

(Continued)

FOREIGN PATENT DOCUMENTS

| | | |
|---|---|---|
| JP | H10-289077 A | 10/1998 |
| JP | 2011-194639 A | 10/2011 |
| WO | WO2011001486 A | 1/2011 |

*Primary Examiner* — Nicholas Pachol
(74) *Attorney, Agent, or Firm* — Hawaii Patent Services; Nathaniel K. Fedde; Kenton N. Fedde

(57) ABSTRACT

Provided is an image forming apparatus that speeds up starting. The image forming apparatus is provided with a main storage part and an auxiliary storage part. A boot loader that is stored in the auxiliary storage part is expanded to the main storage part. The boot loader that has been expanded is executed to generate a defective area table for the auxiliary storage part. When a kernel of an OS that is stored in the auxiliary storage part is expanded, the kernel is caused to be referred the defective area table that has been generated. When the kernel is executed, the defective area table is not generated. Thereby, the defective area table generated by the boot loader can be used by the OS, which allows the boot time to be shortened.

6 Claims, 6 Drawing Sheets

(56) References Cited

U.S. PATENT DOCUMENTS

| | | | |
|---|---|---|---|
| 2012/0030691 A1* | 2/2012 | Miranda | G06F 12/0246 719/328 |
| 2012/0096293 A1* | 4/2012 | Floyd et al. | 713/323 |
| 2012/0116599 A1* | 5/2012 | Arndt et al. | 700/291 |
| 2012/0159126 A1* | 6/2012 | Arimilli et al. | 712/207 |
| 2012/0174101 A1* | 7/2012 | Ciano et al. | 718/1 |
| 2012/0185726 A1* | 7/2012 | Duron et al. | 714/11 |
| 2012/0210152 A1* | 8/2012 | Nayar et al. | 713/321 |
| 2012/0210337 A1* | 8/2012 | Cardona et al. | 719/321 |
| 2012/0284484 A1* | 11/2012 | Abdul et al. | 711/173 |
| 2012/0284549 A1* | 11/2012 | Abdul et al. | 713/323 |
| 2012/0331233 A1* | 12/2012 | Cain et al. | 711/135 |
| 2012/0331466 A1* | 12/2012 | Hall et al. | 718/1 |
| 2013/0019083 A1* | 1/2013 | Cain et al. | 712/203 |
| 2014/0149795 A1* | 5/2014 | Musha | G06F 11/22 714/30 |

* cited by examiner

IMAGE FORMING APPARATUS INCLUDING AUXILIARY STORAGE PART LIMITED IN THE NUMBER OF TIMES REWRITING, IMAGE FORMING METHOD, AND RECORDING MEDIUM

INCORPORATION BY REFERENCE

This application is based on and claims the benefit of priority from Japanese Patent Application No. 2013-158822 filed on Jul. 31, 2013, the contents of which are hereby incorporated by reference.

BACKGROUND

The present disclosure relates to an image forming apparatus, an image forming method, and a recording medium, and particularly to an image forming apparatus including an auxiliary storage part, an image forming method, and a recording medium.

A typical image forming apparatus, such as a printer or a Multifunctional Peripheral (MFP) can print a document or an image.

Some image forming apparatuses are provided with an auxiliary storage part. In the auxiliary storage part, the number of times of rewriting may be limited, or a part of the area for storage may be physically damaged. Therefore, it is necessary to detect a defective area.

SUMMARY

According to one aspect of the present disclosure, an image forming apparatus including a main storage part and an auxiliary storage part is provided. A boot loader expanding part causes a boot loader that is stored in the auxiliary storage part to expand in the main storage part. A defective area table preparing part executes the boot loader expanded by the boot loader expanding part to generate a defective area table for the auxiliary storage part. A kernel defective area referencing part causes a kernel of an OS to be referred the defective area table generated by the defective area table preparing part. When kernel is executed, the defective area table is not generated by the kernel.

According to one aspect of the present disclosure, an image forming method by using an image forming apparatus including a main storage part and an auxiliary storage part is provided. With the image forming method of the present disclosure, a boot loader that is stored in the auxiliary storage part is expanded in the main storage part. Then, the expanded boot loader is executed to generate a defective area table for the auxiliary storage part. Then, a kernel of an OS is caused to reference the defective area table generated, and upon the kernel being executed, the defective area table is not generated.

According to one aspect of the present disclosure, a non-transitory computer-readable recording medium that stores programs to be executed by an image forming apparatus including a main storage part and an auxiliary storage part is provided. The program operates the image forming apparatus as a boot loader expanding part, a defective area table preparing part, and a kernel defective area referencing part. The boot loader expanding part causes a boot loader that is stored in the auxiliary storage part to expand in the main storage part. The defective area table preparing part executes the boot loader expanded by the boot loader expanding part to generate a defective area table for the auxiliary storage part. The kernel defective area referencing part causes a kernel of an OS to be referred the defective area table generated by the defective area table preparing part. When the kernel is executed, the defective area table is not generated by the kernel.

DETAILED DESCRIPTION

Configuration of Entire Image Forming Apparatus 1

Figure 5:
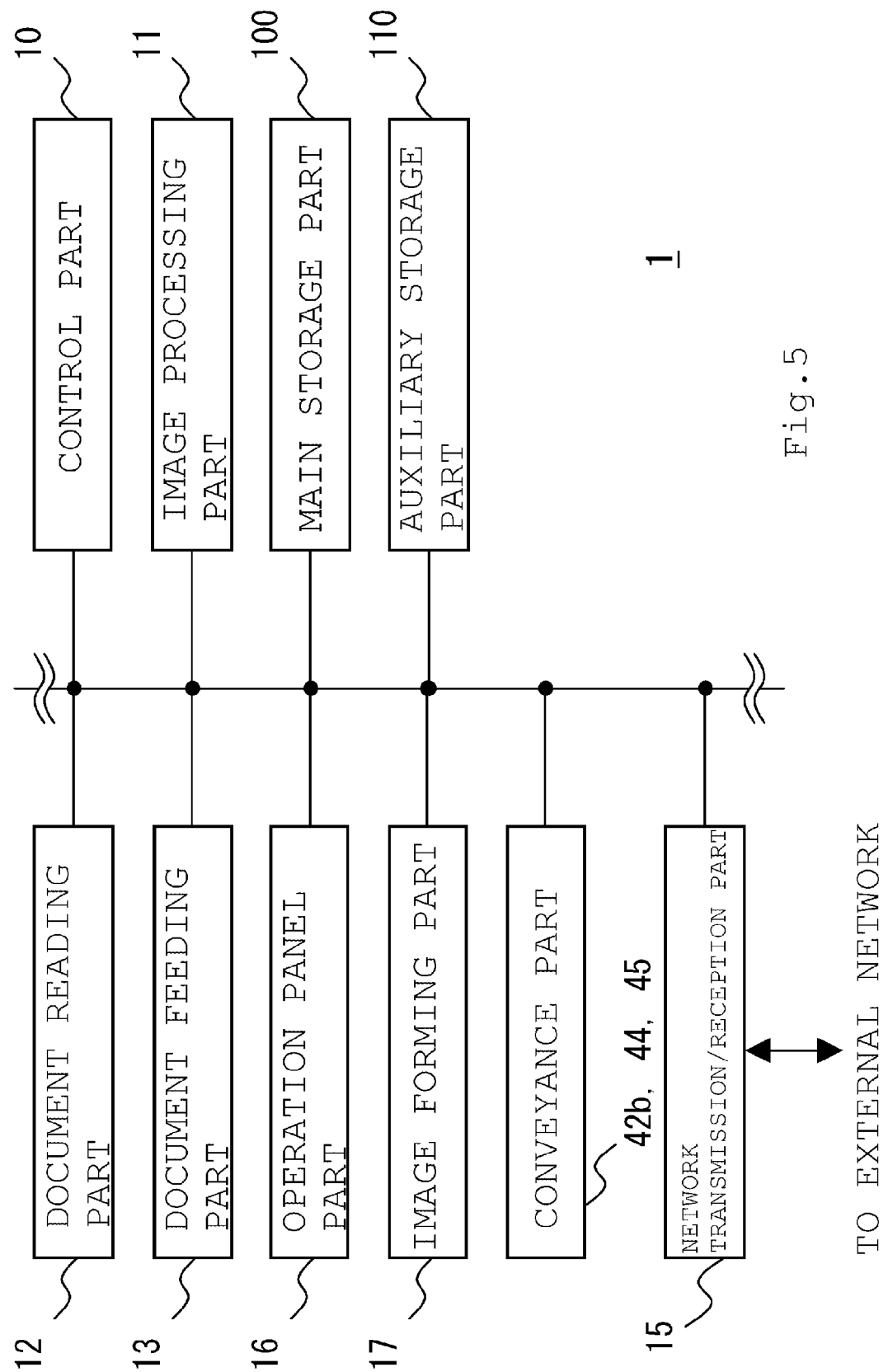
FIG. 5 is a block diagram illustrating a configuration of the entire image forming apparatus according to the embodiment of the present disclosure.

First, with reference to FIG. 5, the configuration of the entire image forming apparatus 1 will be explained.

To the image forming apparatus 1, there are connected a control part 10, an image processing part 11, a document reading part 12, a document feeding part 13, a conveyance part (a feed roller 42b, conveyance rollers 44, and discharge rollers 45), a network transmission/reception part 15, an operation panel part 16, an image forming part 17, a main storage part 100, an auxiliary storage part 110, and the like, with the same bus, and the like. Each part is operation-controlled by the control part 10.

The control part 10 is an information processing part. The control part 10 reads out a control program in the auxiliary storage part 110 to expand it in the main storage part 100, and it executes the control program. Thereby, the control part 10 is operated as the respective parts of a functional parts described later. In addition, the control part 10 controls the entire apparatus in response to prescribed instruction information inputted from an external terminal (not shown) or the operation panel part 16.

The image processing part 11 is a control arithmetic unit. The image processing part 11 performs prescribed image processing on the image data. The image processing part 11 performs various types of image process, such as enlargement/reduction, density adjustment, and gradation adjustment, and image improvement.

The document reading part 12 scans a document that has been set.

The document feeding part 13 carries a document to be read by the document reading part 12.

The image forming part 17 causes, based on an instruction by the user, an image to be formed on a recording sheet from data that has been stored in the main storage part 100 and the auxiliary storage part 110, read by the document reading part 12, or acquired from an external terminal.

Figure 6:
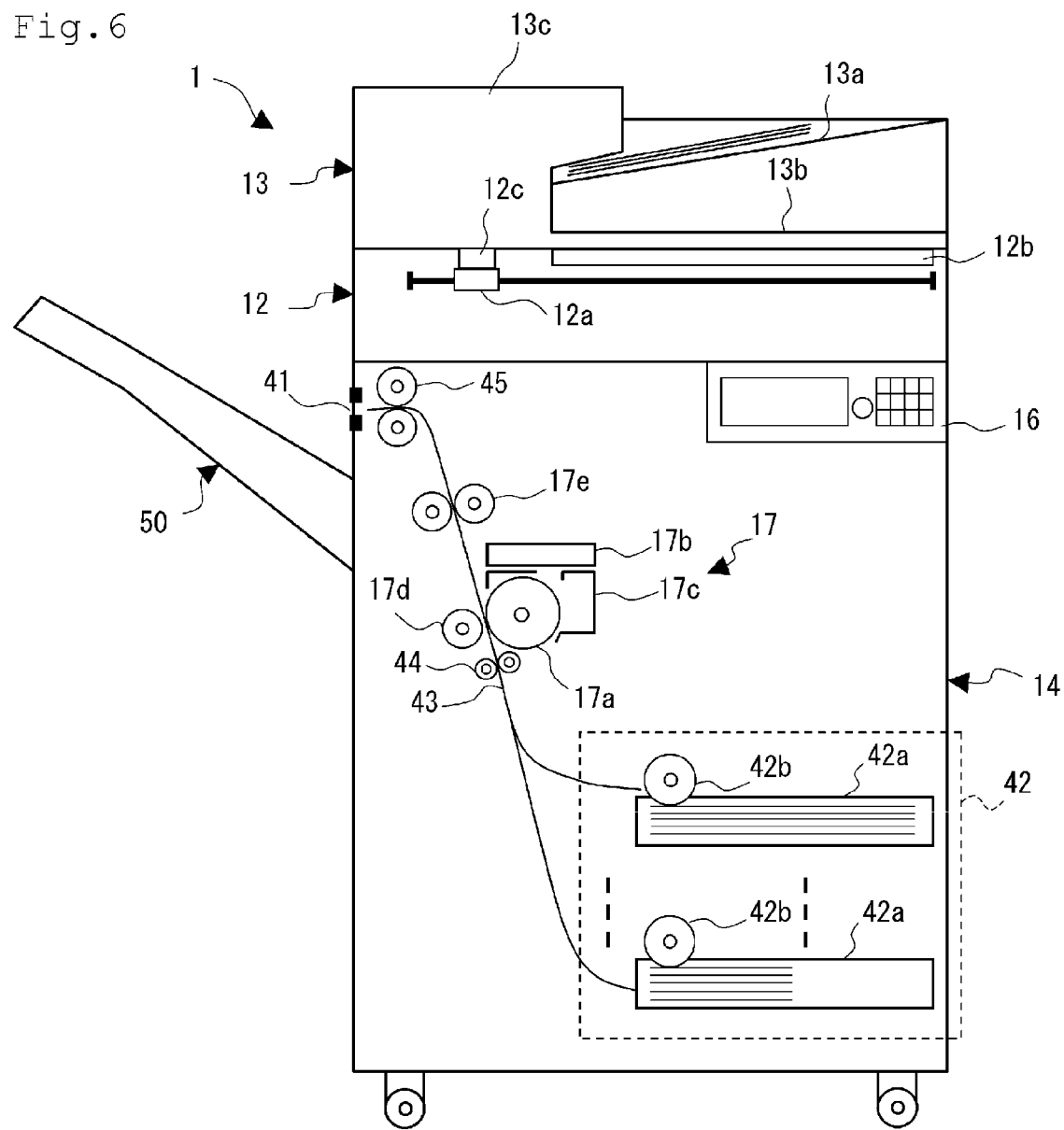
FIG. 6 is a schematic view of the image forming apparatus according to the embodiment of the present disclosure.

The conveyance part conveys a recording sheet from a paper feeding cassette 42a (FIG. 6). In addition, the conveyance part conveys the recording sheet to the image forming part 17, and then the recording sheet on which an image has been formed into the stack tray 50.

The operations of the document reading part 12, the document feeding part 13, the conveyance part, and the image forming part 17 will be described later.

The network transmission/reception part 15 includes a LAN board, a radio frequency transmitter/receiver, and the like, for connecting to an external network.

The network transmission/reception part 15 uses a circuit for data communication to transmit/receive data. The network transmission/reception part 15 also uses an audio telephone circuit for transmitting/receiving an audio signal.

The operation panel part 16 includes a display part and an input part. The input part includes buttons or a touch panel, and the like. The buttons in the input part may include ten keys; a start key; a canceling key; and buttons for selecting an operation mode, such as copying, facsimile transmission, and scanner. Further, the buttons in the input part may include buttons for giving an instruction related to execution of a job, such as printing, transmitting, saving, or recording for the selected document.

The operation panel part 16 acquires instructions given by the user about various jobs for image forming apparatus 1. The operation panel part 16 can also receive or modify a particular user's information based on a user instruction obtained from the operation panel part 16.

The main storage part 100 is a recording medium that is non-transitory. The main storage part 100 stores a program or data that has been read from the auxiliary storage part 110.

The auxiliary storage part 110 is a recording medium that is non-transitory. The auxiliary storage part 110 stores various programs and data.

The auxiliary storage part 110 includes a nonvolatile memory. The nonvolatile memory in the auxiliary storage part 110 may be limited in the number of times for rewriting.

Also, the auxiliary storage part 110 stores a control program including firmware for performing operation-control of the image forming apparatus 1. Also, the auxiliary storage part 110 may include an area for use as a saving folder for each user.

In addition, in the image forming apparatus 1, the control part 10 and the image processing part 11 may be formed as an integral part.

In addition, the image forming apparatus 1 may include a facsimile transmission/reception part for performing facsimile transmission/reception.

Operation of Image Forming Apparatus 1

Then, as refer to FIG. 6, the operation of the image forming apparatus 1 according to the embodiment of the present disclosure will be explained.

The document reading part 12 is disposed on top of the main part 14. The document feeding part 13 is disposed on top of the document reading part 12. The stack tray 50 is disposed on the side of a delivery port 41 for recording sheets that is formed in the main part 14. Further, the operation panel part 16 is disposed on the front side of the image forming apparatus 1.

The document reading part 12 includes a scanner 12a, a platen glass 12b, and a document reading slit 12c. The scanner 12a includes an imaging sensor, and the like. The scanner 12a is movable in a direction of conveyance of a document by the document feeding unit 13. The platen glass 12b is a document table containing a transparent material. The document reading slit 12c has a slit that is formed in a direction orthogonal to the direction of conveyance of a document by the document feeding part 13.

When the scanner 12a is to read a document placed on the platen glass 12b, it is moved to a position opposed to the platen glass 12b. The scanner 12a reads the document placed on the platen glass 12b while scanning the document for acquiring image data. The scanner 12a outputs the acquired image data to the main part 14.

Further, when the scanner 12a is to read a document carried by the document feeding part 13, the scanner 12a is moved to a position opposed to the document reading slit 12c. The scanner 12a reads the document through the document reading slit 12c in synchronization with the document carrying operation of the document feeding part 13 for acquiring image data. The scanner 12a outputs the acquired image data to the main part 14.

The document feeding part 13 includes a document mounting part 13a, a document discharge part 13b, and a document carrying mechanism 13c. The documents placed in the document mounting part 13a are fed in turn one by one by the document carrying mechanism 13c to be carried to a position opposed to the document reading slit 12c. The documents are thereafter discharged into the document discharge part 13b.

The document feeding part 13 may be configured to be tiltable. In other words, by bringing the document feeding part 13 upward, the top face of the platen glass 12b may be opened.

The main part 14 includes an image forming part 17, and also includes a paper feeding part 42, a paper carrying passage 43, conveyance rollers 44, and discharge rollers 45. The paper feeding unit 42 may include a plurality of paper feeding cassettes 42a for storing recording sheets that are different in size or orientation, respectively. Further, the paper feeding unit 42 includes a feed roller 42b for feeding the recording sheets one by one from the paper feeding cassette 42a to the paper carrying passage 43. The feed roller 42b, the conveyance rollers 44, and the discharge rollers 45 function as a conveyance part. The recording sheet is conveyed by this conveyance part.

The recording sheet fed by the feed roller 42b into the paper carrying passage 43 is conveyed by the conveyance rollers 44 into the image forming part 17. Then, the recording sheet provided with a record by the image forming part 17 is discharged into the stack tray 50 by the discharge rollers 45.

The image forming part 17 includes a photosensitive drum 17a, an exposure part 17b, a developing part 17c, a transfer part 17d, and a fixing part 17e. The exposure part 17b outputs light on the basis of the image data to expose the photosensitive drum 17a thereto, forming an electrostatic latent image on the surface of the photosensitive drum 17a. The developing part 17c is a developing unit that uses toner for developing the electrostatic latent image formed on the photosensitive drum 17a. The developing part 17c causes a toner image to be formed on the photosensitive drum 17a on the basis of the electrostatic latent image. The transfer part 17d causes the toner image formed on the photosensitive drum 17a by the developing part 17c to be transferred onto the recording sheet. The fixing part 17e causes the toner image to be fixed on the recording sheet by heating the recording sheet onto which the toner image has been transferred by the transfer part 17d.

System Configuration of Image Forming Apparatus 1

Figure 1:
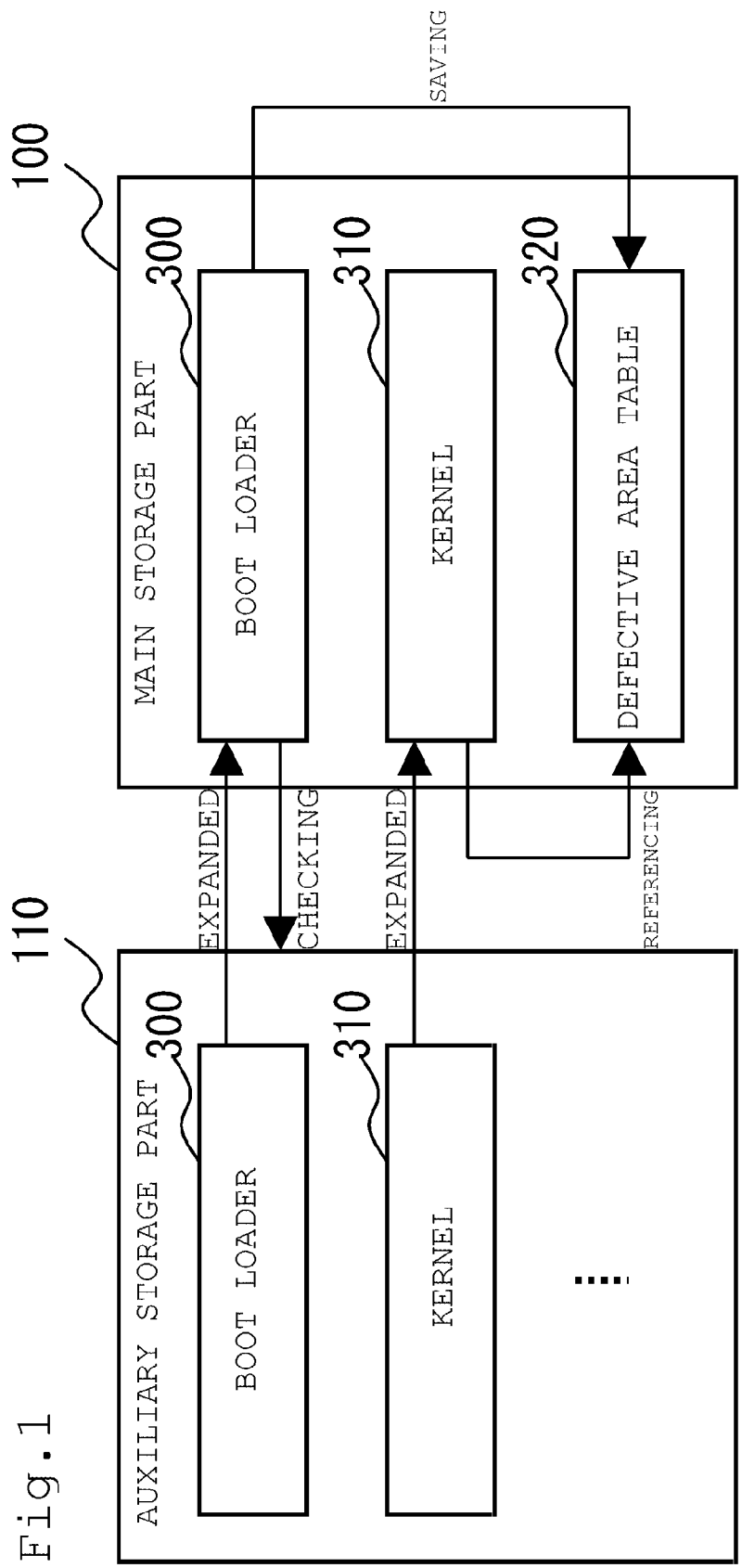
FIG. 1 is a system configuration diagram for an image forming apparatus according to an embodiment of the present disclosure.

With reference to FIG. 1, the configuration of the auxiliary storage part 110 and the main storage part 100 at the time of boot will be explained. In FIG. 1, the same symbol used in FIG. 7 indicates the same component.

In the main storage part 100, a boot loader 300 and a kernel 310 are expanded from the auxiliary storage part 110 to be stored. Further, in the main storage part 100, a defective area table 320 is generated and stored.

In the auxiliary storage part 110, the boot loader 300 and the kernel 310 are stored.

The boot loader 300 provides a program and data for performing initialization of the hardware, starting of the kernel 310, and the like. The boot loader 300 includes an IPL (Initial Program Loader) and a boot loader. The IPL is read out immediately after starting for performing initialization of the hardware. The boot loader reads and starts an OS (Operating System) including the kernel 310, and the like, and other control programs (not shown) from the auxiliary storage part 110.

The kernel 310 provides a program and data in which the basic functions constituting a core portion of the OS are implemented. The kernel 310 manages the hardware and software resources with an API (Application Programming Interface), and the like. In other words, the kernel 310 uses the API, and the like, to intermediate between the hardware provided in the image forming apparatus 1, and the application software (not shown) that is stored in the auxiliary storage part 110 for executing it.

The defective area table 320 is data, such as a table for managing a defective area of the auxiliary storage part 110. The defective area table 320 may be a bad block table for managing a bad block that has been made no longer capable of being written, in the case where the auxiliary storage part 110 is of NAND type flash memory. The defective area table 320 is generated in a format that is commonly usable between the boot loader 300 and the kernel 310.

The details of the defective area table 320 will be described later.

Figure 2:
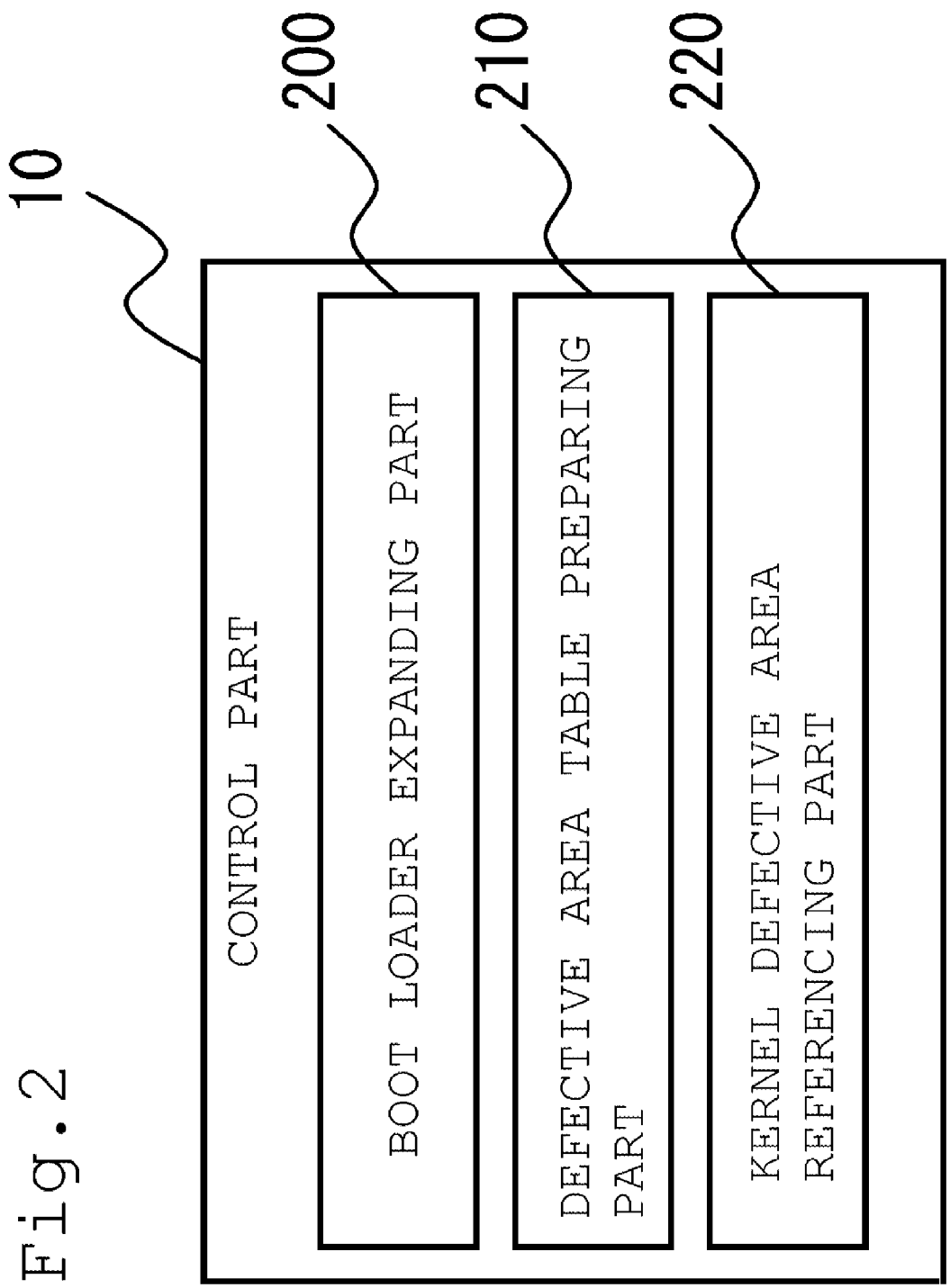
FIG. 2 is a block diagram illustrating a configuration of a control part for the image forming apparatus according to the embodiment of the present disclosure.

With reference to FIG. 2, the control part 10 of the image forming apparatus 1 of the present embodiment includes a boot loader expanding part 200, a defective area table preparing part 210, and a kernel defective area referencing part 220.

The boot loader expanding part 200 reads the boot loader 300 that is stored in the auxiliary storage part 110 and causes it to expand in the main storage part 100.

The defective area table preparing part 210 causes the boot loader 300 expanded by the boot loader expanding part 200 to be executed for preparing the defective area table 320 for the auxiliary storage part 110. In other words, the defective area table preparing part 210 is executed as a process of the boot loader 300 expanded in the main storage part 100 to check for a defective area in the auxiliary storage part 110. The defective area table preparing part 210 saves the information of the checked defective area(s) as a defective area table 320 in the main storage part 100.

Further, the defective area table preparing part 210 generates the defective area table 320 in a format that is usable in common with the boot loader 300 and the kernel 310.

The kernel defective area referencing part 220 causes the kernel 310 to be referred the defective area table 320 that has been generated by the defective area table preparing part 210. In addition, the kernel defective area referencing part 220 makes not generate the defective area table 320 when the kernel 310 is executed.

In other words, the kernel defective area referencing part 220 controls the kernel 310 expanded in the storage part 100 from the auxiliary storage part 110 so as to directly refer the defective area table 320 that the defective area table preparing part 210 has generated by checking the auxiliary storage part 110 at the time of execution of the boot loader 300. In addition, the kernel defective area referencing part 220 controls the kernel 310 so as not to check the defective area in the auxiliary storage part 110 at the time of execution of the kernel 310 that has been expanded in the storage part 100.

Figure 3:
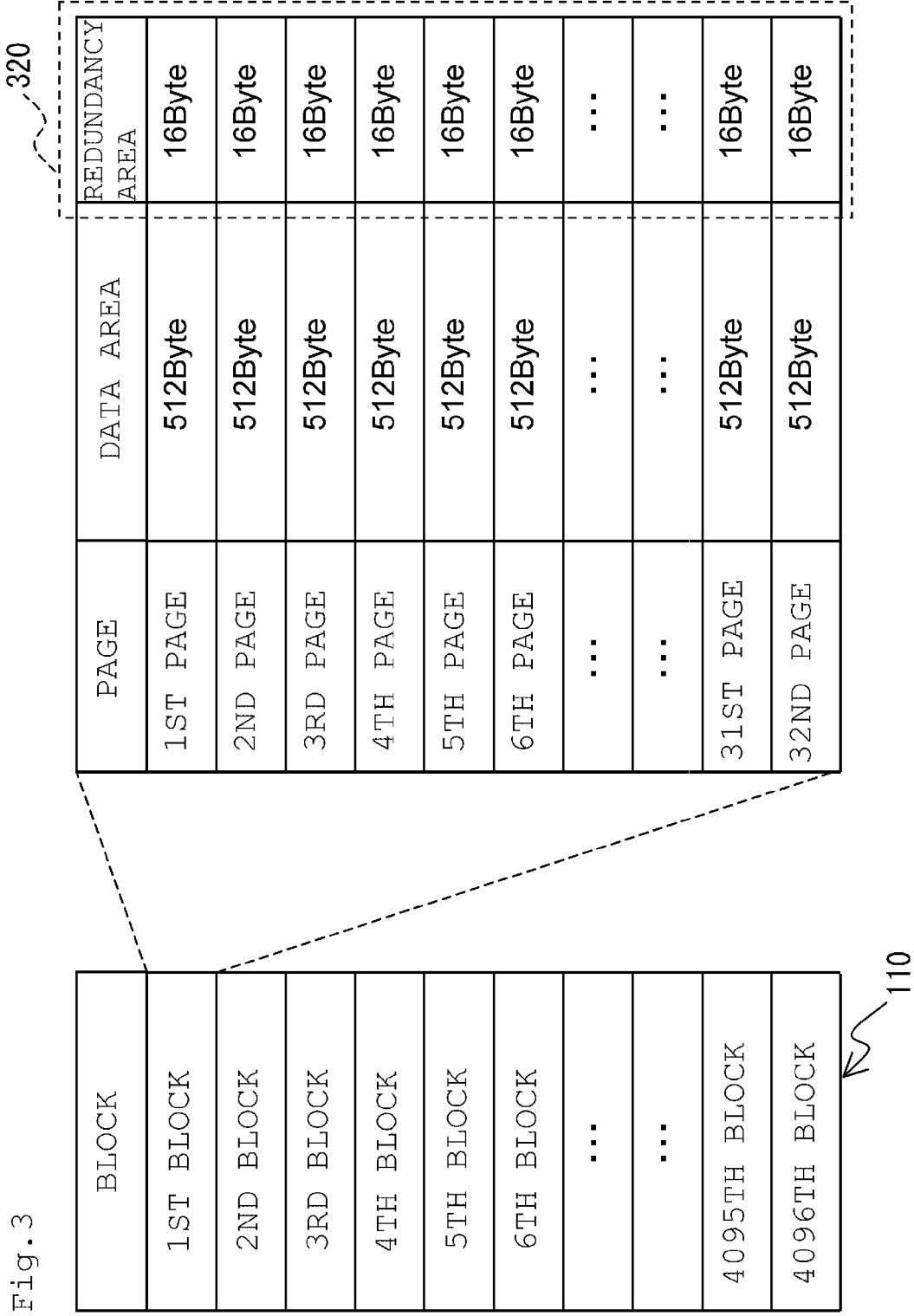
FIG. 3 is a schematic diagram of an auxiliary storage part and a defective area table shown in FIG. 1.

With reference to FIG. 3, the details of the defective area table 320 will be explained.

FIG. 3 shows an example of the defective area table 320 in the case where the auxiliary storage part 110 is, for example, a NAND type flash memory that has capacity of 64 MB and is a small block type.

With the NAND type flash memory, writing and reading operation are performed in units that are called "blocks." The block is further divided into units that are called "pages."

The NAND type flash memory is limited in the number of times for rewriting. With the NAND type flash memory, if the limited number of times for rewriting is exceeded, the possibility of the writing being not completed in a prescribed time is increased. If writing, deleting, or the like, is performed on a "bad block", which is a block including a page with which the writing has not been completed in a prescribed time, an error will be caused. Therefore, for the boot loader 300 and the kernel 310, it is required to specify a bad block as a defective area, and exclude it from the memory management objects for the auxiliary storage part 110.

The information about bad block is stored in the redundancy area that is given to each block. The data as a result of reading the redundancy areas for all the blocks to the main storage part 100 is collected as a table, which is the defective area table 320.

Here, by executing the control programs including the boot loader 300 and the kernel 310 that are stored in the auxiliary storage part 110, the control part 10 of the image forming apparatus 1 functions as the boot loader expanding part 200, the defective area table preparing part 210, and the kernel defective area referencing part 220.

In addition, the above-described respective parts of the image forming apparatus 1 provide hardware resources for executing an image forming method according to the embodiment of the present disclosure.

The auxiliary storage part 110 may be constituted by an auxiliary storage part for the boot loader 300 and that for the kernel 310, and the other programs and data, which are separately provided.

In addition, the control part 10 may incorporate an RAM or ROM, a flash memory, or the like. In the case where the control part 10 incorporates an ROM, the boot loader 300 and the kernel 310 may be stored therein.

Boot Process by Image Forming Apparatus 1

Figure 4:
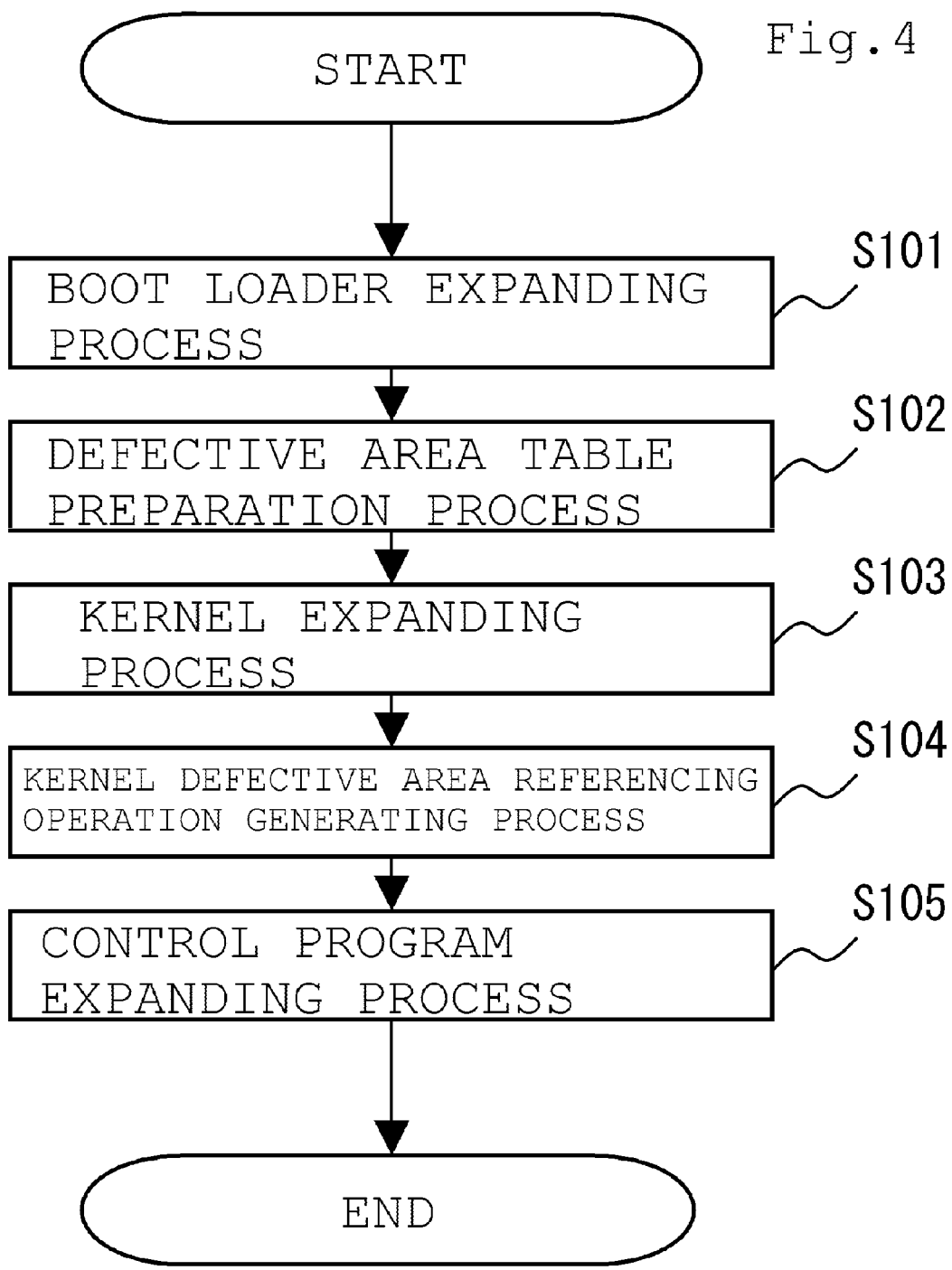
FIG. 4 is a flowchart illustrating the boot process according to the embodiment of the present disclosure.

Then, with reference to FIG. 4, boot process by the image forming apparatus 1 according to the embodiment of the present disclosure will be explained.

The boot process in the present embodiment is executed mainly by the control part 10 expanding the programs that is stored in the auxiliary storage part 110 to the main storage part 100, and executing them by using the hardware resources in cooperation with the respective parts.

Hereinbelow, with reference to the flowchart in FIG. 4, the details of the boot process will be explained for each step.

(Step S101)

At first, the control part 10 uses the boot loader expanding part 200 and performs boot loader expanding process.

The control part 10 causes the boot loader 300 that is stored in the auxiliary storage part 110 to expand in the main storage part 100.

The control part 10 reads the boot loader 300 from the auxiliary storage part 110 to the main storage part 100 and starts the execution thereof.

(Step S102)

Next, the control part 10 uses the defective area table preparing part 210 to perform defective area table preparation process.

The control part 10 executes the boot loader 300 expanded by the boot loader expanding part 200 and generates the defective area table 320 for the auxiliary storage part 110.

The control part 10 generates the defective area table 320 by reading out the redundancy areas (FIG. 3) for the respective blocks of the auxiliary storage part 110 to the main storage part 100. The control part 10 prevents to use a block, which contains even one piece of information about bad block in the redundancy area, in a unit.

In addition, the control part 10 generates the defective area table 320 in a format that is usable in common with the boot loader 300 and the kernel 310.

(Step S103)

Next, the control part 10 performs kernel expanding process.

The control part 10 causes the kernel 310 of the OS that is stored in the auxiliary storage part 110 to expand in the main storage part 100.

The control part 10 executes the boot loader 300 to read the kernel 310 to the main storage part 100.

(Step S104)

Next, the control part 10 uses the kernel defective area referencing part 220 for performing kernel defective area referencing operation generating process.

The control part 10 causes the kernel 310 of the OS that is stored in the auxiliary storage part to reference the defective area table 320 generated by the defective area table preparing part 210 in the main storage part 100.

To achieve this, the control part 10 sets, for example, a pointer to refer the defective area table 320 for the kernel 310. Thereafter, the control part 10 executes the kernel 310. At this time, if the control part 10 detects, for example, the pointer to refer the defective area table 320 for the kernel 310 has been set, the control part 10 will not generate the defective area table 320 by the kernel 310.

In addition, the control part 10 may be configured that it calls kernel 310 stored in the auxiliary storage part 110, having been set, from the first, so as for this defective area table 320 not to be generated.

(Step S105)

Next, the control part 10 performs control program expanding process.

After the kernel 310 having been expanded, the control part 10 executes the kernel 310 to start the remaining control programs including a part of OS.

The control part 10 expands the other programs and data necessary for controlling the image forming apparatus 1, such as the part of the OS other than the kernel 310 and the application programs stored in the auxiliary storage part 110, in the main storage part 100, and it executes them. Thus, the boot is completed.

By the above way, the boot process according to the embodiment of the present disclosure is terminated.

By providing the above-described configuration, the following advantageous effect will be obtained.

For using a typical technology, both the boot loader and the kernel generate the defective area tables by reading the information of all the defective areas in the auxiliary storage part, respectively. Therefore, the time for reading the information about all the defective areas twice has been required, and the process retards the boot completion as a result.

Contrarily to this, an image forming apparatus 1 according to an embodiment of the present disclosure is provided with a main storage part 100 and an auxiliary storage part 110, including:

a boot loader expanding part 200 for expanding a boot loader 300 being stored in the auxiliary storage part 110 in the main storage part 100, a defective area table preparing part 210 for executing the boot loader 300 expanded by the boot loader expanding part 200 to generate a defective area table 320 for the auxiliary storage part 110, and a kernel defective area referencing part 220 for causing a kernel 310 of an OS to be referred the defective area table 320 generated by the defective area table preparing part 210, and upon the kernel 310 being executed, preventing the defective area table 320 from being generated.

With such a configuration, the defective area table 320 that has been generated by the boot loader 300 at the time of initial boot process of the image forming apparatus 1 can also be used by the kernel 310. Therefore, the time for reading out the auxiliary storage part 110 to generate the defective area table 320 can be cut to thereby speed up the boot.

In other words, the present embodiment allows the defective area table 320 that has been generated by the boot loader 300 to be used also by the kernel 310. Thereby, the need for preparing the defective area table in a duplicate manner is eliminated, whereby the starting can be speeded up.

Further, with the image forming apparatus according to the embodiment of the present disclosure, the auxiliary storage part is a flash memory, and the defective area table 320 is a table that has been generated by reading out the redundancy areas of the respective pages of each block of the flash memory.

With such a configuration, the defective area table 320 generated by the boot loader 300 and the defective area table 320 to be used by the kernel 310 are provided with a common format by the control part 10. Thereby, the need for performing such a process to convert the defective area table 320 generated by the boot loader 300 is not needed when it is to be used by the kernel 310. Thereby, the time required for conversion of the defective area table 320 can be reduced during whole boot time.

Other Embodiments

In addition, the control part 10 needs not to generate the defective area table 320 for all the blocks in the auxiliary storage part 110. For example, the control part 10 may generate a defective area table for the blocks other than the area in which the boot loader 300 is placed.

With such a configuration, the need for reading all the bad blocks is eliminated. Thereby, the boot can be speeded up.

In addition, with such a configuration, the need for writing or reading the area of the boot loader 300 at the time of execution of the OS is eliminated. Thereby, the consumption of the memory capacity of the main storage part 100 can be suppressed. In addition, at the time of accessing to the auxiliary storage part 110, the defective area table 320 can be browsed at a higher speed, whereby the performance can be improved.

In addition, after the control part 10 has generated the defective area table 320 with the boot loader 300, it may specify a predetermined area to be a write inhibit one like the defective area. This allows the critical area to be prevented from being falsified by a virus, or the like, during execution of the kernel 310 by the control part 10.

Further, at the time of execution of the boot loader 300, the control part 10 may execute the defective area table preparing part 210 in a specific privilege mode (supervisor mode or hypervisor mode). In addition, the control part 10 may generate the defective area table 320 in an area in the main storage part 100 that can be rewritten only in the privilege mode. In addition, the control part 10 may execute the loaded kernel 310 in a mode that is lower in privilege level.

With such a configuration, the possibility that the defective area table 320 may be falsified is eliminated. Thereby, the possibility that an area in the auxiliary storage part 110 in which a virus, or the like, is stored may be camouflaged by the virus, or the like, as a bad block, is eliminated to thereby allow deletion of the area. Thereby, the security can be improved.

In addition, the type of recording medium is not limited to the NAND type flash memory, and the auxiliary storage part 110 can also generate the defective area table 320 for a recording medium, such as a ReRAM, which is limited in the number of times for rewriting. In addition, also in this case, as in the above-described embodiment, the kernel 310 can be caused to be referred the defective area table 320. In this case, the capacities of the page and the block can also be changed depending upon the type of the recording medium.

In addition, in the case where the auxiliary storage part 110 is an HDD, the defective area table 320 using information about a defective sector, or the like, can also be generated.

In addition, the control part 10 may change the format, and the like, when it uses the boot loader 300 to generate the defective area table 320, and causes the kernel 310 to reference it.

In addition, the control part 10 may set a defective area table in such a form as a pointer array in the kernel 310 in correspondence to the defective area table 320 generated by the boot loader 300. In other words, the control part 10 may generate a defective area table that allows the kernel 310 to continuously reference the blocks other than the bad blocks.

Thereby, the control part 10 can generate a defective area table for a continuous area at the time of execution of the OS including the kernel 310. Therefore, if the auxiliary storage part 110 is dotted with bad blocks, the possibility that the access speed may be retarded is eliminated.

Further, the present disclosure is applicable to information process apparatuses other than the image forming apparatus. In other words, the configuration provided may be such that it uses such a tool as a network scanner, or a server to which a scanner is separately connected with a USB, or the like.

The configuration and operation of the above embodiments are examples, and of course it is possible to alter them as appropriate for implementation within the scope of the gist of the present disclosure for execution.

What is claimed is:

1. A method of starting an image forming apparatus by using both a main memory and an auxiliary memory, wherein the auxiliary memory comprises a nonvolatile NAND flash memory that is limited in the number of times for rewriting, the method comprising:

expanding a boot loader being stored in the auxiliary memory into the main memory, wherein,
the boot loader provides a program and data for performing initialization of a hardware in the image forming apparatus and starting of a kernel, and
the kernel provides a program and data in which functions thereof constitute a core portion of an operating system (OS) for i) managing hardware and software resources with an Application Programming Interface (API), and ii) using the API to intermediate between the hardware in the image forming apparatus and application software stored in the auxiliary memory;
executing the expanded boot loader to generate a defective area table for the auxiliary memory, wherein,
the defective area table is a table that manages a defective area for the auxiliary memory and is stored in the main memory,
the defective area table is a table that is generated in a format that is commonly usable between the boot loader and the kernel,
the defective area table comprises a bad block table for managing a bad block to which is no longer capable of being written, and
information about the bad block is stored in a redundancy area that is given to each block of the NAND flash memory;
setting a pointer that controls the kernel to refer to the defective area table generated by the boot loader;
controlling the kernel to refer to the defective area table generated by the boot loader, wherein,
following the step of setting the pointer, the pointer is detected, and the pointer controls the kernel to not generate the defective area table again and perform said step of controlling the kernel to refer to the defective area table generated by the boot loader; and
executing, during boot of the image forming apparatus, the kernel without checking the defective area of the auxiliary memory for bad blocks to which are longer capable of being written.

2. The method according to claim 1, wherein said generating a defective area table for the auxiliary memory comprises generating the defective area table for blocks other than blocks in the area in which the boot loader is placed and not generating the defective area table for blocks in the area in which the boot loader is placed.

3. The method according to claim 1, further comprising inhibiting a predetermined area from being rewritten after generating the defective area table with the boot loader.

4. The method according to claim 3, wherein the predetermined area is added to the defective area table after said step of generating the defective area table.

5. The method according to claim 1,
wherein said generating a defective area table for the auxiliary memory comprises generating the defective area table in a specific privilege mode; and
wherein the step of executing the kernel comprises executing the kernel in a mode that is lower than the specific privilege mode.

6. The method according to claim 1,
wherein said generating a defective area table for the auxiliary memory comprises generating the defective area table in an area in the main storage part that can be rewritten in a specific privilege mode; and wherein the step of executing the kernel comprises executing the kernel in a mode that is lower than the specific privilege mode.

* * * * *